(12) United States Patent
Nishibayashi et al.

(10) Patent No.: US 11,658,309 B2
(45) Date of Patent: May 23, 2023

(54) AMMONIA FUEL CELL

(71) Applicants: THE UNIVERSITY OF TOKYO, Tokyo (JP); NISSAN CHEMICAL CORPORATION, Tokyo (JP)

(72) Inventors: Yoshiaki Nishibayashi, Tokyo (JP); Kazunari Nakajima, Tokyo (JP); Hiroki Toda, Tokyo (JP); Shoichi Kondo, Funabashi (JP); Takamasa Kikuchi, Funabashi (JP)

(73) Assignees: THE UNIVERSITY OF TOKYO, Tokyo (JP); NISSAN CHEMICAL CORPORATION, Tokyo (JP)

( * ) Notice: Subject to any disclaimer, the term of this patent is extended or adjusted under 35 U.S.C. 154(b) by 91 days.

(21) Appl. No.: 17/437,765

(22) PCT Filed: Mar. 2, 2020

(86) PCT No.: PCT/JP2020/008726
§ 371 (c)(1),
(2) Date: Sep. 9, 2021

(87) PCT Pub. No.: WO2020/184256
PCT Pub. Date: Sep. 17, 2020

(65) Prior Publication Data
US 2022/0158202 A1    May 19, 2022

(30) Foreign Application Priority Data
Mar. 14, 2019  (JP) .............................. JP2019-047213

(51) Int. Cl.
*H01M 4/90* (2006.01)
*H01M 8/22* (2006.01)

(52) U.S. Cl.
CPC ......... *H01M 4/9041* (2013.01); *H01M 8/222* (2013.01)

(58) Field of Classification Search
CPC ........................... H01M 4/9041; H01M 8/222
See application file for complete search history.

(56) References Cited

U.S. PATENT DOCUMENTS

| | | | |
|---|---|---|---|
| 2003/0091889 A1 | 5/2003 | Sotomura et al. | |
| 2005/0095466 A1* | 5/2005 | Minteer | H01M 8/16 429/526 |

FOREIGN PATENT DOCUMENTS

| | | | |
|---|---|---|---|
| JP | 2003-151567 A | 5/2003 | |
| JP | 2004-345964 A | 12/2004 | |
| JP | 2011-056416 A | 3/2011 | |

(Continued)

OTHER PUBLICATIONS

Ganley, Jason C., "An Intermediate-Temperature Direct Ammonia Fuel Cell With a Molten Alkaline Hydroxide Electrolyte", Journal of Power Sources, vol. 178, (2008), pp. 44-47.

(Continued)

*Primary Examiner* — Karie O'Neill Apicella
(74) *Attorney, Agent, or Firm* — Oliff PLC

(57) ABSTRACT

A fuel cell is an ammonia fuel cell using an ammonia-containing fuel. A catalyst used for an anode of the fuel cell is a ruthenium complex having two first ligands and one second ligand, and the first ligand is pyridine or a condensed cyclic pyridine compound with or without a substituent, and the second ligand is 2,2'-bipyridyl-6,6'-dicarboxylic acid with or without a substituent on a pyridine ring.

8 Claims, 1 Drawing Sheet

(56) References Cited

FOREIGN PATENT DOCUMENTS

JP          2017-135061 A       8/2017
JP          2017-136562 A       8/2017

OTHER PUBLICATIONS

Hejze, T. et al., "Current Status of Combined Systems Using Alkaline Fuel Cells and Ammonia as a Hydrogen Carrier", Journal of Power Sources, vol. 176, (2008), pp. 490-493.
Afif, Ahmed et al., "Ammonia-Fed Fuel Cells: a Comprehensive Review", Renewable and Sustainable Energy Review, vol. 60, (2016), pp. 822-835.
Gottesfeld, Shimshon, "The Direct Ammonia Fuel Cell and a Common Pattern of Electrocatalytic Processes", Journal of The Electrochemical Society, vol. 165, No. 15, (2018), pp. J3405-J3412.
Siddiqui, O. et al., "Investigation of a New Anion Exchange Membrane-Based Direct Ammonia Fuel Cell System", Fuel Cells, vol. 18, No. 4, (2018), pp. 379-388.
May 26, 2020 Search Report issued in International Patent Application No. PCT/JP2020/008726.

* cited by examiner

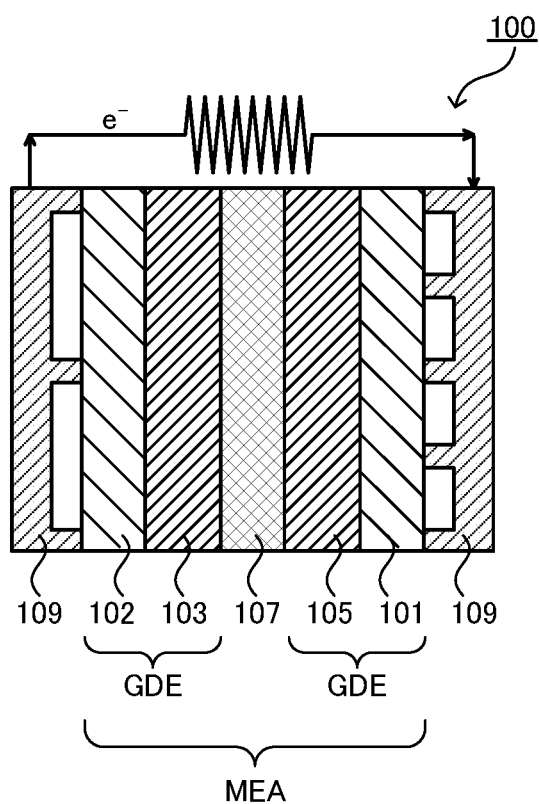

AMMONIA FUEL CELL

TECHNICAL FIELD

The present disclosure relates to an ammonia fuel cell or more specifically an ammonia fuel cell that uses ammonia directly as a fuel. Especially, the present disclosure relates to an ammonia fuel cell configured to use a ruthenium complex as a catalyst of an anode.

BACKGROUND

Proposed examples of the fuel cell using ammonia as the fuel include an ammonia fuel cell using an electrolyte of molten potassium hydroxide, an alkaline fuel cell using ammonia as the fuel and the like (as described in Non-Patent Literatures 1 to 5).

CITATION LIST

Non-Patent Literatures

[Non-Patent Literatures 1] J. Power Sources 2008, vol. 178, p 44
[Non-Patent Literatures 2] J. Power Sources 2008, vol. 176, p 490
[Non-Patent Literatures 3] Renew. Sustain. Energy Rev. 2016, vol 60, p 822
[Non-Patent Literatures 4] J. Electrochem. Soc. 2018, vol. 165, pJ3405
[Non-Patent Literatures 5] Fuel Cells 2018, vol 18, p 379

SUMMARY

Technical Problem

The above proposed examples disclose fuel cells that use ammonia as the fuel and use a solid catalyst obtained by fixing metal alone such as platinum or ruthenium or an alloy thereof to carbon, alumina, an inorganic substance or the like, as the catalyst for an anode of the fuel cell. Such fuel cells, however, have a problem that they need a high temperature and a high overvoltage.

The present disclosure aims to solve the problem described above, and a main object of the present disclosure is to allow for power generation of a fuel cell using ammonia as a fuel under mild conditions by using a molecular ruthenium complex in place of the conventional solid catalyst or metal particle catalyst for an anode of the fuel cell.

Solution to Problem

In order to achieve the object described above, the inventors have studied oxidative decomposition of ammonia by using various ruthenium complexes as the catalyst and have found that using a specific ruthenium complex as the catalyst provides nitrogen, protons, and electrons with high efficiency and that the ruthenium complex serves as the catalyst in an anode of the ammonia fuel cell to complete the present disclosure.

That is, ammonia fuel cell of present of the present disclosure is
an ammonia fuel cell using an ammonia-containing fuel, wherein a catalyst used for an anode of the fuel cell is a ruthenium complex having two first ligands and one second ligand, wherein the first ligand is pyridine or a condensed cyclic pyridine compound with or without a substituent, and the second ligand is 2,2'-bipyridyl-6,6'-dicarboxylic acid with or without a substituent on a pyridine ring.

The catalyst may be, for example, a ruthenium complex expressed by any of Chemical Formula (A) to Chemical Formula (C).

[Chem. 1]

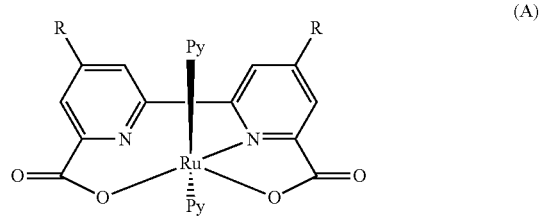

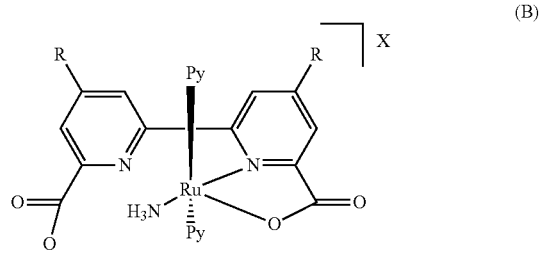

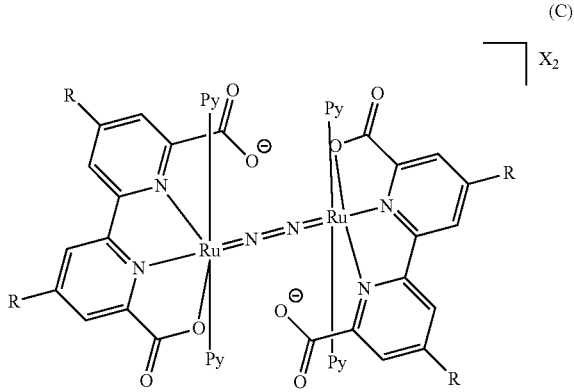

(where Py denotes pyridine with or without an alkyl group, an alkoxy group, an aryl group or a halogen atom in 4-position or isoquinoline with or without an alkyl group, an alkoxy group, an aryl group or a halogen atom in 6-position; R denotes an alkyl group, an alkoxy group, an aryl group or a halogen atom, and X denotes a monovalent anion.)

The ruthenium complex of Chemical Formula (B) is obtained by one-electron oxidation and ammonia coordination of the ruthenium complex of Chemical Formula (A). The ruthenium complex of (C) is a nitrogen complex formed after repetition of one-electron oxidation and deprotonation of the ruthenium complex of Chemical Formula (B). The ruthenium complex of Chemical Formula (B) and the ruthenium complex of Chemical Formula (C) are intermediates generated in the process of oxidative decomposition of ammonia by the ruthenium complex of Chemical Formula (A), and these intermediates also serve as the catalyst.

BRIEF DESCRIPTION OF DRAWINGS

FIG. 1 is a schematic diagram illustrating the configuration of a fuel cell 100 according to an embodiment.

DESCRIPTION OF EMBODIMENTS

The following shows a preferable embodiment of an ammonia fuel cell according to the present disclosure.

The ammonia fuel cell of the embodiment takes advantage of oxidative decomposition of ammonia that oxidatively decomposes ammonia to obtain nitrogen, protons and electrons in the presence of a catalyst or in the presence of a catalyst and a base ($2NH_3 \rightarrow N_2 + 6H^+ + 6e^-$). The catalyst is a ruthenium complex having two first ligands and one second ligand, wherein the first ligand is pyridine or a condensed cyclic pyridine compound with or without a substituent, and the second ligand is 2,2'-bipyridyl-6,6'-dicarboxylic acid with or without a substituent on a pyridine ring.

In the ammonia fuel cell of the embodiment, the catalyst is a ruthenium complex having two first ligands and one second ligand. The first ligand is pyridine or a condensed cyclic pyridine compound with or without a substituent. The first ligand is, for example, pyridine, isoquinoline, quinoline, pyridine with a substituent in at least one of 2-position to 6-position, isoquinoline with a substituent in at least one of 1-position and 3-position to 8-position, and quinoline with a substituent in at least one of 2-position to 8-position. The substituent is not specifically limited but is, for example, an alkyl group, an alkoxy group, an aryl group, or a halogen atom. The alkyl group may be, for example, a linear or a branched alkyl group, such as methyl group, ethyl group, propyl group, butyl group, pentyl group, hexyl group or any of their structural isomers or may be a cyclic alkyl group, such as cyclopropyl group, cyclobutyl group, cyclopentyl group, or cyclohexyl group. The alkyl group preferably has one to twelve carbon atoms and more preferably has one to six carbon atoms. The alkoxy group may be, for example, a linear or a branched alkoxy group, such as methoxy group, ethoxy group, propoxy group, butoxy group, pentoxy group, hexyloxy group, or any of their structural isomers or may be a cyclic alkoxy group, such as cyclopropoxy group, cyclobutoxy group, cyclopentoxy group, or cyclohexyloxy group. The alkoxy group preferably has one to twelve carbon atoms and more preferably has one to six carbon atoms. The aryl group is, for example, phenyl group, tolyl group, xylyl group, naphthyl group, or any of their substituents having at least one atom among hydrogen atoms on the respective rings substituted by an alkyl group or a halogen atom. The halogen atom is, for example, fluorine atom, chlorine atom, bromine atom, or iodine atom. The second ligand is a 2,2'-bipyridyl-6,6'-dicarboxylic acid that may have a substituent on the pyridine ring. The second ligand is not limited to the 2,2'-bipyridyl-6,6'-dicarboxylic acid but may be, for example, a 2,2'-bipyridyl-6,6'-dicarboxylic acid with a substituent in at least one of 3-position to 5-position and 3'-position to 5'-position of the pyridine ring. The substituent is not specifically limited but is, for example, an alkyl group, an alkoxy group, an aryl group, or a halogen atom. Concrete examples thereof are those listed above. The amount of this catalyst used is a catalytic amount relative to ammonia and is, for example, preferably not less than 0.001 times but not greater than 0.1 times the mole number of ammonium and more preferably not less than 0.002 times but not greater than 0.01 times the mole number of ammonium.

The catalyst may be preferably a ruthenium complex expressed by any of Chemical Formula (A) to Chemical Formula (C).

[Chem. 2]

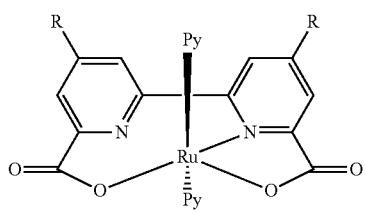

(A)

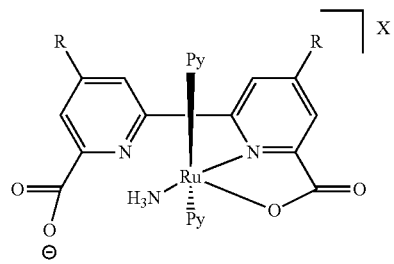

(B)

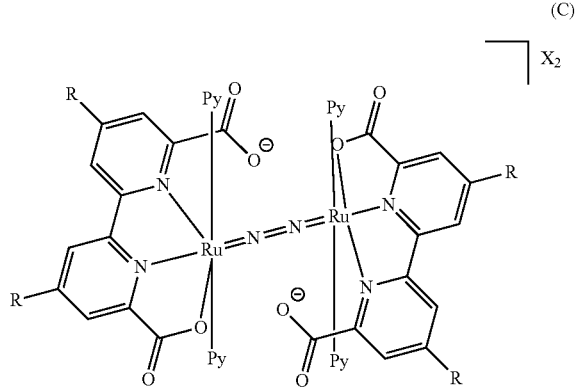

(C)

(where Py denotes pyridine with or without an alkyl group, an alkoxy group, an aryl group or a halogen atom in 4-position or isoquinoline with or without an alkyl group, an alkoxy group, an aryl group or a halogen atom in 6-position; R denotes an alkyl group, an alkoxy group, an aryl group or a halogen atom, and X denotes a monovalent anion.) Examples of the alkyl group, the alkoxy group, the aryl group, and the halogen group in Chemical Formula 2 are those listed above. The monovalent anion is, for example, hexafluorophosphate ion, hexachloroantimonate ion, trifluoromethanesulfonate ion, tetrafluoroborate ion, phosphate ion, sulfonate ion, chloride, bromide, iodide, or hydroxide.

In the ammonia fuel cell of the embodiment, the base serves to trap the proton generated in the process of oxidative decomposition of ammonia and to supply an anode-side fuel from an ammonium salt. The base is not specifically limited but may be any base having such functions. The base is, for example, an inorganic base, a pyridine derivative or the like. An alkali metal hydroxide is preferably used as the inorganic base. The alkali metal hydroxide is not specifically limited but is, for example, sodium hydroxide, potassium hydroxide, or lithium hydroxide. Examples of the pyridine derivative include a substituted pyridine with a substituent in at least one of 2-position to 6-position, as well as pyridine. The substituent is not specifically limited but is, for example, an alkyl group, a dialkylamino group, an alkoxy group, an aryl group, or a halogen atom. Examples of the alkyl group (including the alkyl group in the dialkylamino group), the alkoxy group, the aryl group and the halogen atom are those listed above. Concrete examples of the pyridine derivative include pyridine, 2,6-lutidine, 2,4,6-collidine, and 4-dimethylaminopyridine (DMAP). Among them, 2,4,6-collidine is preferable. In the case of generating the anode ammonia in the fuel cell by a reaction of an ammonium salt and a base in situ, this base is also used for an anode-side fuel solution of the fuel cell.

In the anode-side fuel of the ammonia fuel cell of the embodiment, the ammonia may be an ammonia gas or may be generated by the reaction of the ammonium salt and the base in situ. When there is a need to determine the quantity of ammonia, it is preferable to generate the ammonia in situ like the latter case. The ammonium salt is not specifically limited but may be any ammonium salt that quantitatively generates ammonia by the reaction with the base. Examples of the ammonium salt include ammonium triflate, ammonium hexafluorophosphate, ammonium chloride, ammonium bromide, ammonium iodide, ammonium hydroxide, ammonium acetate, ammonium sulfate, and ammonium phosphate, and ammonium triflate is preferable. Examples of a cathode-side fuel in the ammonium fuel cell of the embodiment include oxygen, the air, humidified oxygen and humidified air, and oxygen is preferable.

In the ammonia fuel cell of the embodiment, oxidative decomposition of ammonia proceeds even at the reaction temperature that is lower than the conventional temperature. For example, the reaction proceeds even under a mild condition, such as ordinary temperature (room temperature), 0° C. or −20° C. The reaction atmosphere may be, for example, an inert atmosphere (such as Ar atmosphere) or may be the the atmospheric air. The reaction atmosphere is an atmosphere under ordinary pressure, although a pressurized atmosphere may also be employable.

In the ammonia fuel cell of the embodiment, the oxidative decomposition of ammonia is expected to proceed in a reaction mechanism shown by the following scheme. This scheme illustrates a case using a ruthenium complex Ru(II) of Chemical Formula (A) as the catalyst. A ruthenium complex [Ru(III) —NH$_3$] of Chemical Formula (B) is generated by one-electron oxidation and subsequent ammonia coordination of the ruthenium complex of Chemical Formula (A). Subsequently, [Ru(IV) —NH$_2$], [Ru(V) =NH] and [Ru(VI) ≡N] are sequentially generated by repetition of one-electron oxidation and deprotonation. A ruthenium complex [Ru(IV) =N=N=Ru(IV)] of Chemical Formula (C) is then generated by dimerization of [Ru(VI) ≡N] or dimerization and subsequent deprotonation of [Ru(V) =NH]. Exchange of nitrogen with ammonia returns this ruthenium complex [Ru(IV) =N=N=Ru(IV)] to [Ru(III) —NH$_3$]. Accordingly, this generates nitrogen by the ligand exchange reaction and causes new ammonia to be introduced into the cycle of the catalytic reaction.

[Chem. 3]

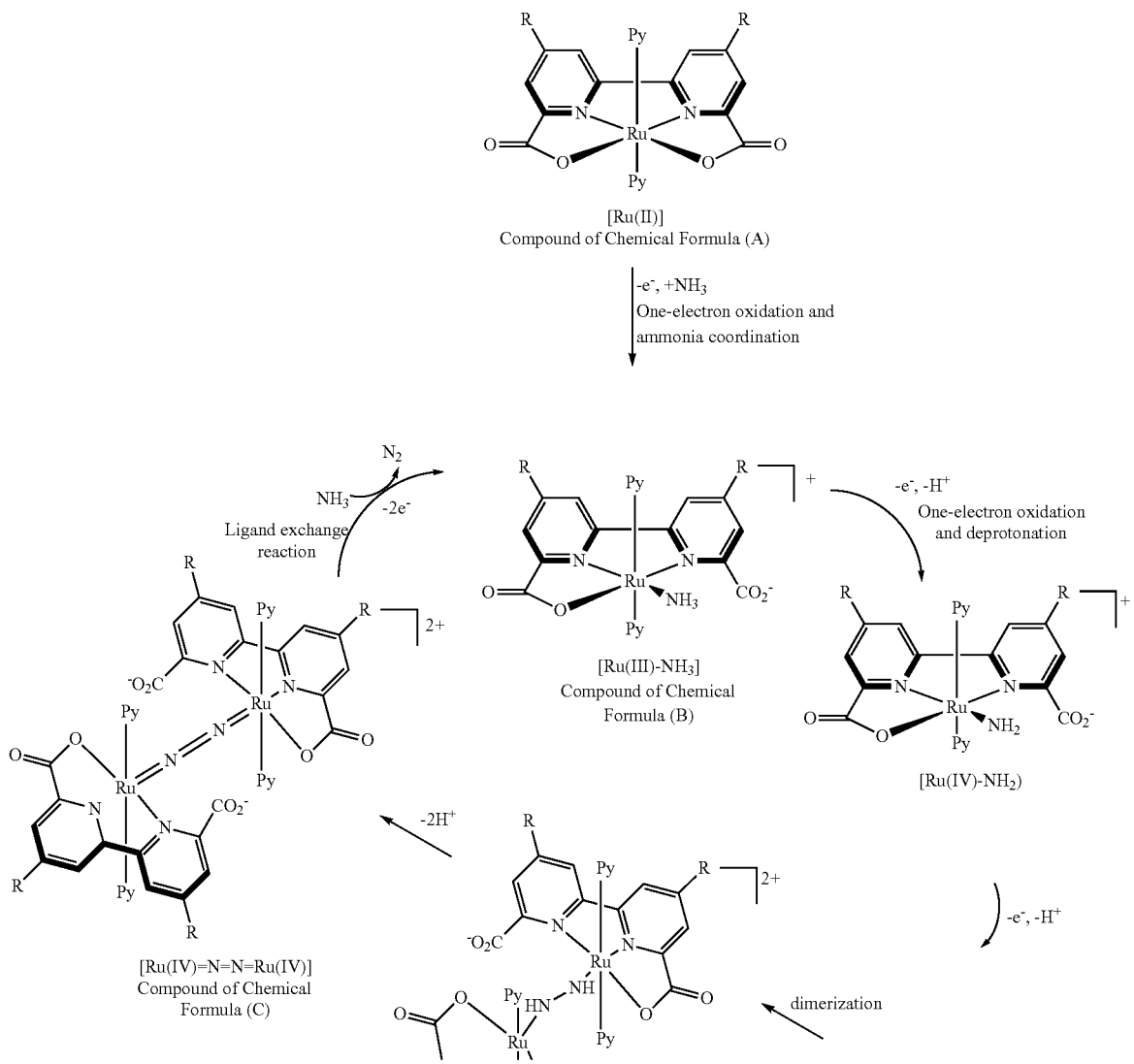

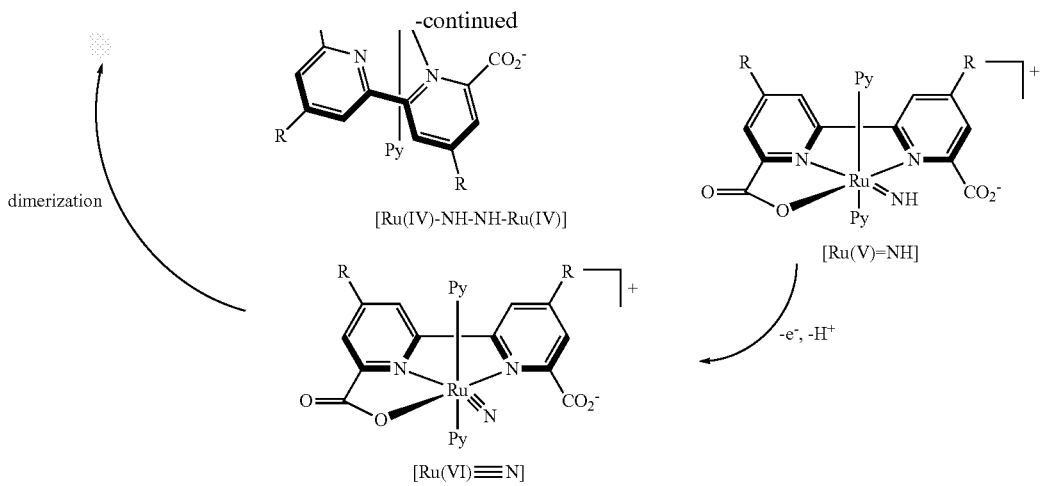

As understood from the reaction mechanism described above, the ruthenium complex of Chemical Formula (B) and the ruthenium complex of Chemical Formula (C) are intermediates generated in the process of oxidative decomposition of ammonia by the ruthenium complex of Chemical Formula (A), and these intermediates also serve as the catalyst.

In the ammonia fuel cell of the embodiment, an anode denotes an electrode which the electric current flows in from an external circuit, whereas a cathode denotes an electrode which the electric current flows out to the external circuit. From the electrochemical viewpoint, the former is the electrode where an oxidation reaction occurs, and the latter is the electrode where a reduction reaction occurs.

FIG. 1 is a sectional view schematically illustrating the configuration of a fuel cell 100 that uses ammonia as a fuel. The following describes the fuel cell 100 using ammonia as the fuel. The fuel cell 100 includes an anode catalyst layer 103, a cathode catalyst layer 105, and an electrolyte membrane 107 placed between the two catalyst layers. The cathode catalyst layer 105 has a gas diffusion layer 101 on outside thereof, and the anode catalyst layer 103 has a gas diffusion layer 102 on outside thereof. A device configured by the gas diffusion layer 102, the anode catalyst layer 103, the electrolyte membrane 107, the cathode catalyst layer 105 and the gas diffusion layer 101 is called a membrane electrode assembly (hereinafter abbreviated as "MEA"). The fuel cell 100 generally has this MEA placed between separators 109. Furthermore, a composition configured by a catalyst layer and a gas diffusion layer is called a gas diffusion electrode (hereinafter abbreviated as "GDE").

The fuel cell 100 uses an ion exchange resin membrane or the like as the electrolyte membrane 107. In the fuel cell 100, hydroxide ions generated by a reaction of oxygen, electrons and water ($O_2+4e^-+4H_2O \rightarrow 4OH^-$) at an oxidant electrode that is the cathode catalyst layer 105 move through the electrolyte membrane 107 to a fuel electrode that is the anode catalyst layer 103, and nitrogen, electrons and protons are generated by a reaction of ammonia ($2NH_3 \rightarrow N_2+6e^-+6H^+$) at the fuel electrode. The ion exchange resin membrane is not specifically limited but may be any ion exchange resin membrane that enables the hydroxide ions generated at the oxidant electrode to move to the fuel electrode. The ion exchange resin membrane is, for example, a cation exchange membrane or an anion exchange membrane. Examples of the cation exchange membrane include a Nafion (registered trademark, manufactured by DuPont) membrane, an Aquivion (registered trademark, manufactured by Solvay) membrane, a FLEMION (registered trademark, manufactured by AGC Inc.) membrane, and Aciplex (registered trademark, manufactured by Asahi Kasei Corp.) membrane. The anion exchange membrane is, for example, a polymer electrolyte membrane containing an anion exchange resin having an anion exchange group such as a quaternary ammonium group or a pyridinium group. Among them, the anion exchange membrane is preferable. Concrete examples of the anion exchange membrane include FAP, FAP-450, FAA-3, FAS, FAB and AMI-7001 that are anion exchange membranes manufactured by FUMATECH BWT GmbH and AMV, AMT, DSV, AAV, ASV, ASV-N, AHO, and APS4 that are anion exchange membranes manufactured by AGC Inc. Among them, FAP-450 and FAA-3 manufactured by FUMATECH BWT GmbH and ASV-N manufactured by AGC Inc. are preferable.

The anode catalyst layer 103 includes a catalyst component (the ruthenium complex described above), a catalyst carrier serving to adsorb the catalyst component, and an electrolyte. The cathode catalyst layer 105, on the other hand, includes a catalyst component, a catalyst carrier serving to support the catalyst component, and an electrolyte. Any known catalyst without limitation may be used as the catalyst component in the cathode catalyst layer 105. Examples of the catalyst component used in the cathode catalyst layer 105 include metals such as platinum, gold, silver, ruthenium, iridium, rhodium, palladium, osmium, tungsten, lead, iron, chromium, cobalt, nickel, manganese, vanadium, molybdenum, gallium, and aluminum and their alloys. Among them, platinum is preferable.

Examples of the catalyst carrier in each of the catalyst layers 103 and 105 include carbon blacks such as channel black, furnace black, thermal black, acetylene black, and Ketjen black, activated carbons by carbonization and activation of various carbon atom-containing materials, coke, natural graphite, artificial graphite, carbonaceous materials such as graphitized carbon, and metal mesh and metal foam of nickel, titanium or the like. Among them, the carbon black having a high specific surface area and excellent electron conductivity is preferable as the catalyst carrier.

The electrolyte in each of the catalyst layers 103 and 105 is, for example, a cation exchange ionomer or an anion exchange ionomer. Examples of the cation exchange ionomer include fluorinated sulfonic acid polymers such as Nafion (registered trademark, manufactured by DuPont), Aquivion (registered trademark, manufactured by Solvay), FLEMION (registered trademark, manufactured by AGC Inc.) and Aciplex (registered trademark, manufactured by Asahi Kasei Corp.) Examples of the anion exchange ionomer include Fumion FAA-3-SOLUT-10 manufactured by FUMATECH BWT GmbH, and A3ver.2 and AS-4 that are anion conductive ionomers manufactured by Tokuyama Corporation (A3ver.2 and AS-4 are described in, for example, Journal of Hydrogen Energy Systems Society of Japan, Vol. 35, No. 2 (2010), page 9). Among them, the anion exchange ionomer is preferable, and Fumion FAA-3-SOLUT-10 and AS-4 are more preferable.

The separators 109 may be any gas-impermeable conductive members and are, for example, carbon plates provided by compressing carbon to be gas impermeable or solid metal plates. A flow path for supply of ammonia is provided between the separator 109 and the anode-side gas diffusion layer 102. A gas passage for supply of oxygen or the air is formed between the separator 109 and the cathode-side gas diffusion layer 101.

The present disclosure is not at all limited to the embodiments described above but may be implemented by a variety of aspects within the technical scope of the present disclosure.

EXAMPLES

The following describes examples of the present disclosure. The examples described below are, however, not intended to limit the present disclosure in any sense.

[Synthesis Example 1] Synthesis of Ruthenium Complex (2a)

[Chem. 4]

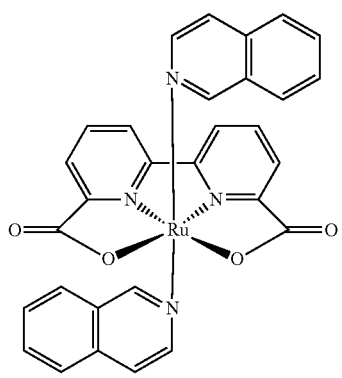

(2a)

A ruthenium complex (2a) was synthesized as described below by referring to a method described in Nat. Chem. 2012, vol. 4, p 418. Tetrakis(dimethylsulfoxide)dichlororuthenium(II) (484 mg, 1.00 mmol), 2,2'-bipyridine-6,6'-dicarboxylic acid (224 mg, 1.00 mmol), and triethylamine (2 mL) were placed in a Schlenk tube in an argon atmosphere at 25 to 28° C. and were heated to reflux for 2 hours after addition of methanol (20 mL). Isoquinoline (1.17 mL, 10 mmol) was subsequently added, and the reaction solution was further heated to reflux for 12 hours. The reaction solution was purified by column chromatography and was then recrystallized in a solution containing methanol and ether. The ruthenium complex (2a) was obtained as a brown solid substance (274 mg, 0.323 mmol, yield: 46%).

Spectral data of the ruthenium complex (2a)

$^1$H NMR (270 MHz, methanol-d$_4$+CDCl$_3$): δ=8.66 (s, 2H), 8.60 (d, 2H, J=8.1 Hz), 8.08 (d, 2H, J=7.6 Hz), 7.97-7.70 (m, 8H), and 7.66-7.49 (m, 6H).

$^{13}$C NMR (methanol-d$_4$+CDCl$_3$): δ=174.3, 160.5, 157.4, 156.8, 142.9, 135.4, 132.8, 129.2, 127.8, 126.7, 125.2, and 122.5.

[Synthesis Example 2] Synthesis of Ruthenium Complex (2g)

[Chem. 5]

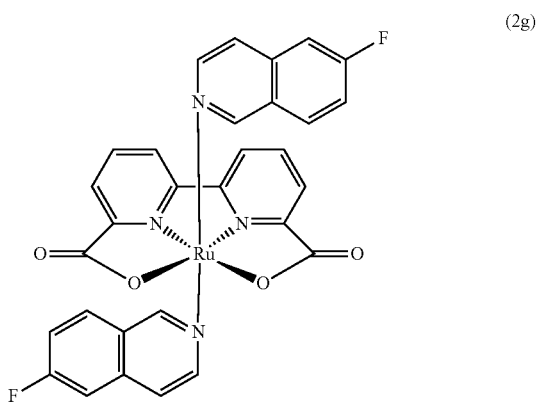

(2g)

A ruthenium complex (2g) was synthesized as described below by referring to a method described in Chem. Commun. 2014, 50, 12947. Tetrakis(dimethylsulfoxide)dichlororuthenium(II) (200 mg, 0.410 mmol), 2,2'-bipyridine-6,6'-dicarboxylic acid (100 mg, 0.410 mmol), and triethylamine (0.3 mL) were placed in a Schlenk tube in an argon atmosphere at 25 to 28° C. and were heated to reflux for 2 hours after addition of methanol (20 mL). 6-fluoroisoquinoline (120.7 mg, 0.82 mmol) was subsequently added, and the reaction solution was further heated to reflux for 12 hours. The reaction solution was purified by column chromatography and was then recrystallized in a solution containing methanol and ether. The ruthenium complex (2g) was obtained as a brown solid substance (101 mg, 0.160 mmol, yield: 39%).

Spectral Data of the Ruthenium Complex (2g)

$^1$H NMR (400 MHz, methanol-d$_4$): δ=8.68 (d, J=7.8 Hz, 2H), 8.63 (s, 2H), 8.02 (d, J=7.8 Hz, 2H), 7.91-8.00 (m, 4H), 7.63 (d, J=7.2 Hz, 2H), 7.57 (d, J=6.4 Hz, 2H), 7.51 (dd, J=2.4 Hz, 2.4 Hz, 2H), and 7.44 (td, J=9.0 Hz, 9.0 Hz, 2.4 Hz, 2H).

[Example 1] Power Generation Test of Fuel Cell 1

A power generation test was performed for a fuel cell using the ruthenium complex (2a) of Synthesis Example 1 as the catalyst of the anode catalyst layer and ammonia as the fuel. An MEA of the fuel cell was formed from a cathode-side GDE, an anode-side GDE and an electrolyte membrane.

The cathode-side GDE was manufactured as described below. A catalyst ink used for a cathode catalyst layer was prepared by using an electrode catalyst as platinum-supported carbon (manufactured by Tanaka Kikinzoku Kogyo K.K., content of platinum: 46.5% by weight, trade name:

"TEC10E50E"), deionized water, ethanol (manufactured by FUJIFILM Wako Pure Chemical Corporation), and an anion conductive ionomer dispersion [AS-4 manufactured by Tokuyama Corporation (5% by weight of n-propyl alcohol dispersion)]. The catalyst ink was prepared to have the ratio of the anion conductive ionomer in the catalyst ink equal to 28% by weight. The catalyst ink was prepared by adding the electrode catalyst, the deionized water, the ethanol, and the anion conductive ionomer dispersion in this sequence to a glass vial container and by exposing the resulting dispersion solution to ultrasonic wave at an output level of 40% for 30 minutes using an ultrasonic homogenizer Smurt NR-50M manufactured by MICROTEC CO., LTD. The catalyst ink obtained was then applied on a gas diffusion layer that was a carbon paper (a 2.5 cm×3 cm rectangular cut piece of "TGP-H-090" manufactured by TORAY INDUSTRIES, INC.) fixed to a hot plate set at 80° C. The amount of application was regulated such that 1 cm² of the application surface had the amount of platinum of 1 mg. The cathode-side GDE (including the platinum catalyst (7.5 mg) on the GDE) composed of the cathode catalyst layer and the gas diffusion layer was accordingly obtained.

The following describes the ratio of the anion conductive ionomer in the catalyst ink described above. The catalyst ink was prepared to have the ratio (% by weight) of the anion conductive ionomer calculated by an equation given below, equal to 28% by weight. In this equation, the anion conductive ionomer is abbreviated as "ionomer":

ratio (% by weight) of ionomer=[solid content (weight) of ionomer/[electrode catalyst (weight)+solid content (weight) of ionomer]]×100

More specifically, in the case of using a 5% by weight of the anion conductive ionomer dispersion, the amount of the electrode catalyst was 100.0 mg, the amount of the anion conductive ionomer dispersion was 778.0 mg, the amount of deionized water was 0.6 mL, and the amount of ethanol was 5.1 mL.

The anode-side GDE was manufactured as described below. A catalyst ink used for an anode catalyst layer was prepared by using the ruthenium complex (2a) (46.5 mg) prepared in Synthesis Example 1, carbon black (53.5 mg of Ketjen black, manufactured by Lion Corporation, trade name: "EC300J"), deionized water, ethanol (manufactured by FUJIFILM Wako Pure Chemical Corporation), and an anion conductive ionomer dispersion [AS-4 manufactured by Tokuyama Corporation (5% by weight of n-propyl alcohol dispersion)]. The catalyst ink was prepared to have the ratio of the anion conductive ionomer in the catalyst ink equal to 28% by weight. The catalyst ink was prepared by adding the ruthenium complex, the carbon black, the deionized water, the ethanol, and the anion conductive ionomer dispersion in this sequence to a glass vial container and by exposing the resulting dispersion solution to ultrasonic wave at an output level of 40% for 30 minutes using an ultrasonic homogenizer Smurt NR-50M manufactured by MICROTEC CO., LTD. The catalyst ink obtained was then applied on a gas diffusion layer that was a carbon paper (a 2.5 cm×3 cm rectangular cut piece of "TGP-H-090" manufactured by TORAY INDUSTRIES, INC.) fixed to a hot plate set at 80° C.
The amount of application was regulated such that 1 cm² of the application surface had the amount of the ruthenium complex of 1 mg. The anode-side GDE (including the ruthenium complex (7.5 mg, 0.012 mmol) on the GDE) composed of the anode catalyst layer and the gas diffusion layer was accordingly obtained.

The following describes the ratio of the anion conductive ionomer in the catalyst ink described above. The catalyst ink was prepared to have the ratio (% by weight) of the anion conductive ionomer calculated by an equation given below, equal to 28% by weight. In this equation, the anion conductive ionomer is abbreviated as "ionomer":

ratio (% by weight) of ionomer=[solid content (weight) of ionomer/[ruthenium complex (weight)+carbon black(weight)+solid content (weight) of ionomer]]×100

More specifically, in the case of using a 5% by weight of the anion conductive ionomer dispersion, the amount of the ruthenium complex was 46.5 mg, the amount of carbon black was 53.5 mg, the amount of the anion conductive ionomer dispersion was 778.0 mg, the amount of deionized water was 0.6 mL, and the amount of ethanol was 5.1 mL.

The electrolyte membrane used was ASV-N (membrane thickness of 100 μm) manufactured by AGC Inc.

An MEA was manufactured by combining the anode-side GDE, the electrolyte membrane, and the cathode-side GDE with one another in this sequence. This MEA was placed on a unit cell (fuel cell manufactured by Nissan Chemical Corporation) having a 2.5 cm×3 cm rectangular electrode area. A power generation test of the fuel cell was performed by using an electrochemical measurement system (SP-300 manufactured by Bio-Logic) to measure the current density and the voltage and to measure the open circuit voltage (hereinafter referred to as "OCV"). The OCV denotes a potential in the state that no voltage or no electric current is applied to the unit cell. The conditions of the power generation test are given below.

Condition of Power Generation Test unit cell temperature: 25 to 28° C. (room temperature);
fuel supply on the anode side: supply an anode-side fuel solution (7 mL) all together; and
fuel supply on the cathode side: supply by mounting an experiment balloon filled with oxygen to a supply port.

The anode-side fuel solution used was prepared by adding ammonium triflate (1.00 g, 6.0 mmol), deionized water (10 mL), and 2,4,6-collidine (0.80 mL, 6.0 mmol) to a screw tube.

The OCV of the unit cell was 0.12 V. The results of the current density and the voltage are shown in Table 1.

TABLE 1

| Current density (mA/cm²) | Voltage(V) |
|---|---|
| 0.02 | 0.10 |
| 0.04 | 0.09 |
| 0.06 | 0.07 |
| 0.08 | 0.05 |

[Example 2] Power Generation Test of Fuel Cell 2

A power generation test was performed for a fuel cell using the ruthenium complex (2g) of Synthesis Example 2 as the catalyst of the anode catalyst layer and ammonia as the fuel. The power generation test of the fuel cell using ammonia as the fuel was performed by a similar procedure to that of Example 1, except that the ruthenium complex (2g) of Synthesis Example 2 was used in place of the ruthenium complex (2a). The OCV of the unit cell was 0.14 V. The results of the current density and the voltage are shown in Table 2.

TABLE 2

| Current density (mA/cm$^2$) | Voltage(V) |
| --- | --- |
| 0.02 | 0.14 |
| 0.04 | 0.13 |
| 0.06 | 0.12 |
| 0.08 | 0.12 |
| 0.10 | 0.11 |
| 0.12 | 0.10 |
| 0.14 | 0.08 |
| 0.16 | 0.07 |

[Example 3] Power Generation Test of Fuel Cell 3

A power generation test was performed for a fuel cell using the ruthenium complex (2a) of Synthesis Example 1 as the catalyst of the anode catalyst layer and ammonia as the fuel. An MEA of the fuel cell was formed from a cathode-side GDE, an anode-side GDE and an electrolyte membrane.

The cathode-side GDE was manufactured by a similar method to the method of manufacturing the cathode-side GDE of Example 1, except that the anion conductive ionomer dispersion was changed to Fumion FAA-3-SOLUT-10 (10% by weight of N-methyl-2-pyrrolidone dispersion) manufactured by FUMATECH BWT GmbH, that the temperature of the hot plate was changed to 90° C., and that the carbon paper was changed to "TGP-H-090H" manufactured by Chemix Inc. With respect to a concrete example of the catalyst ink, in the case of using the 10% by weight of the anion conductive ionomer dispersion, the amount of the electrode catalyst was 100.0 mg, the amount of the anion conductive ionomer dispersion was 389.0 mg, the amount of deionized water was 0.6 mL, and the amount of ethanol was 5.1 mL.

The anode-side GDE was manufactured by a similar method to the method of manufacturing the anode-side GDE of Example 1, except that the anion conductive ionomer dispersion was changed to Fumion FAA-3-SOLUT-10 (10% by weight of N-methyl-2-pyrrolidone dispersion) manufactured by FUMATECH BWT GmbH, that the temperature of the hot plate was changed to 90° C., and that the carbon paper was changed to "TGP-H-090H" manufactured by Chemix Inc. With respect to a concrete example of the catalyst ink, in the case of using the 10% by weight of the anion conductive ionomer dispersion, the amount of the ruthenium complex was 46.5 mg, the amount of carbon black was 53.5 mg, the amount of the anion conductive ionomer dispersion was 389.0 mg, the amount of deionized water was 0.6 mL, and the amount of ethanol was 5.1 mL.

The electrolyte membrane used was FAA-3 (membrane thickness of 50 μm) manufactured by FUMATECH BWT GmbH.

An MEA was manufactured by combining the anode-side GDE, the electrolyte membrane, and the cathode-side GDE with one another in this sequence. A power generation test of a fuel cell using this MEA and using ammonia as the fuel was performed by a similar procedure to that of Example 1. The OCV of the unit cell was 0.18 V. The results of the current density and the voltage are shown in Table 3.

TABLE 3

| Current density (mA/cm$^2$) | Voltage(V) |
| --- | --- |
| 0.02 | 0.17 |
| 0.04 | 0.15 |
| 0.06 | 0.12 |

TABLE 3-continued

| Current density (mA/cm$^2$) | Voltage(V) |
| --- | --- |
| 0.08 | 0.08 |
| 0.10 | 0.04 |

[Example 4] Power Generation Test of Fuel Cell 4

A power generation test was performed for a fuel cell using the ruthenium complex (2g) of Synthesis Example 2 as the catalyst of the anode catalyst layer and ammonia as the fuel. The power generation test of the fuel cell using ammonia as the fuel was performed by a similar procedure to that of Example 3, except that the ruthenium complex (2g) of Synthesis Example 2 was used in place of the ruthenium complex (2a). The OCV of the unit cell was 0.20 V. The results of the current density and the voltage are shown in Table 4.

TABLE 4

| Current density (mA/cm$^2$) | Voltage(V) |
| --- | --- |
| 0.02 | 0.19 |
| 0.04 | 0.17 |
| 0.06 | 0.14 |
| 0.08 | 0.11 |
| 0.10 | 0.08 |
| 0.12 | 0.04 |

INDUSTRIAL APPLICABILITY

The disclosure is applicable to ammonia fuel cell.

The invention claimed is:

1. An ammonia fuel cell using an ammonia-containing fuel, wherein a catalyst used for an anode of the fuel cell is a ruthenium complex having two first ligands and one second ligand, wherein the first ligand is pyridine or a condensed cyclic pyridine compound with or without a substituent, and the second ligand is 2,2'-bipyridyl-6,6'-dicarboxylic acid with or without a substituent on a pyridine ring.

2. The ammonia fuel cell according to claim 1, wherein the catalyst is a ruthenium complex expressed by any of Chemical Formula (A) to Chemical Formula (C),

[Chem. 1]

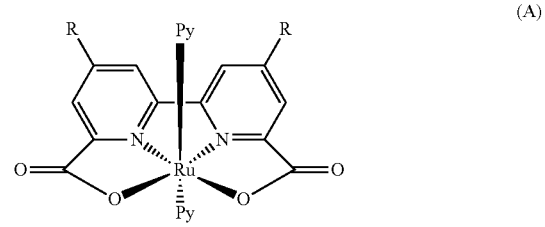

(A)

-continued

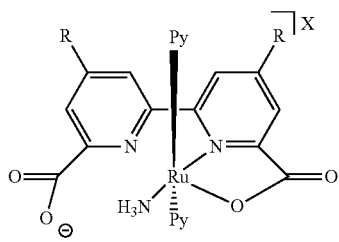
(B)

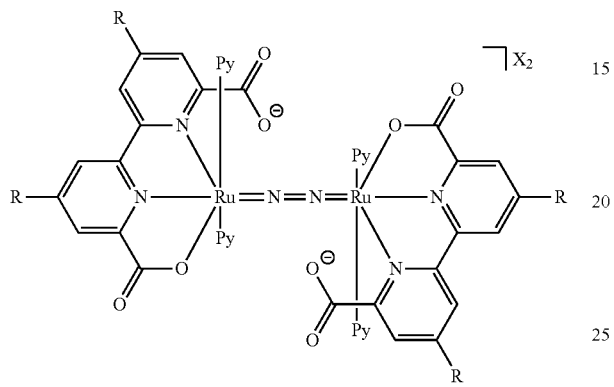
(C)

(where Py denotes pyridine with or without an alkyl group, an alkoxy group, an aryl group or a halogen atom in 4-position or isoquinoline with or without an alkyl group, an alkoxy group, an aryl group or a halogen atom in 6-position; R denotes an alkyl group, an alkoxy group, an aryl group or a halogen atom, and X denotes a monovalent anion).

3. The ammonia fuel cell according to claim 1, wherein ammonia as the fuel is generated by a reaction of an ammonium salt and a base in situ.

4. The ammonia fuel cell according to claim 3, wherein the base is a pyridine with or without a substituent in at least one of 2-position to 6-position.

5. The ammonia fuel cell according to claim 4, wherein the base is 2,4,6-collidine.

6. The ammonia fuel cell according to claim 2, wherein ammonia as the fuel is generated by a reaction of an ammonium salt and a base in situ.

7. The ammonia fuel cell according to claim 6, wherein the base is a pyridine with or without a substituent in at least one of 2-position to 6-position.

8. The ammonia fuel cell according to claim 7, wherein the base is 2,4,6-collidine.

* * * * *